UNITED STATES PATENT OFFICE.

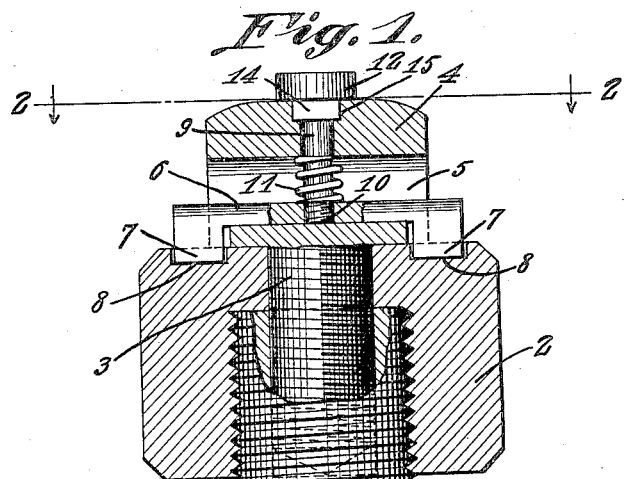
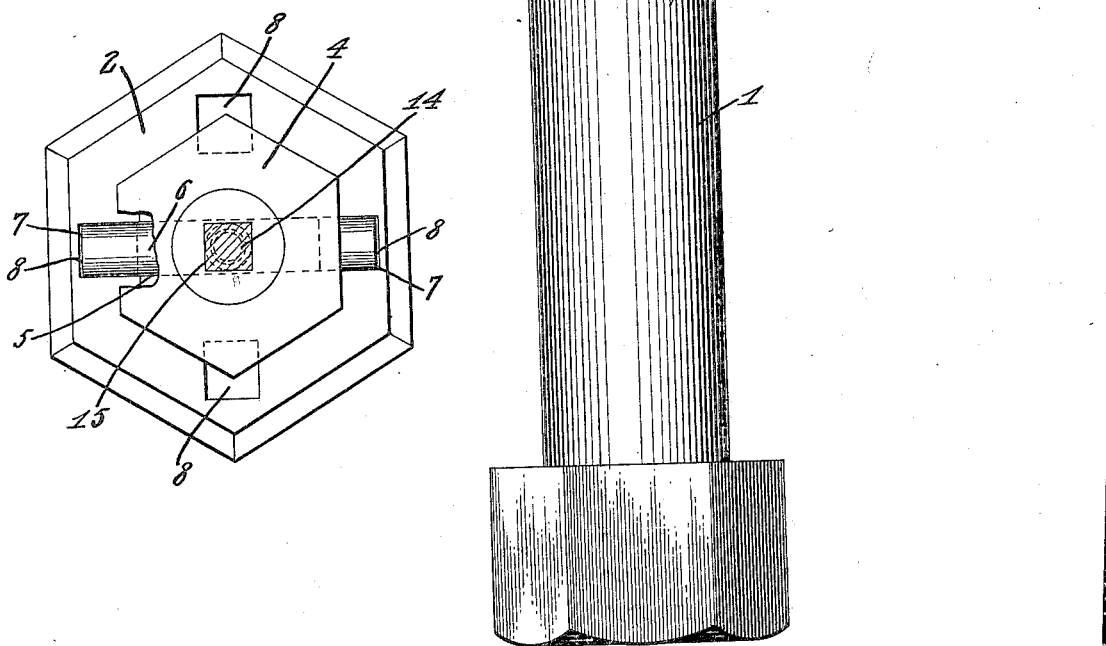

LOUIS MARTAIN SARTAIN, OF PELHAM, TENNESSEE.

LOCK-NUT.

1,384,859.

Specification of Letters Patent. Patented July 19, 1921.

Application filed October 25, 1920. Serial No. 419,234.

*To all whom it may concern:*

Be it known that I, LOUIS M. SARTAIN, a citizen of the United States, residing at Pelham, in the county of Grundy and State of Tennessee, have invented a new and useful Lock-Nut, of which the following is a specification.

This invention aims to provide efficient means for preventing a nut from rotating on a bolt.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, parts appearing in elevation; Fig. 2 is a section on the line 2—2 of Fig. 1.

The numeral 1 marks a bolt. A nut 2 is threaded in one direction on the bolt 1, and a screw 3 is threaded in an opposite direction into the end of the bolt 1. The screw 3 has an enlarged head 4 provided with a transverse recess 5. A latch 6 is located in the recess 5 and is movable in the recess, longitudinally of the bolt 1, the latch being provided with terminal projections 7 adapted to coöperate with seats 8 in one end of the nut 2. The numeral 9 designates an operating member or plunger, slidable longitudinally in the head 4 of the screw 3 and rotatable therein, to a slight extent. The inner end of the operating member or plunger 9 is threaded at 10 into the intermediate portion of the latch 6. A compression spring 11 is located in the recess 5, one end of the spring abutting against the head 4, the other end of the spring abutting against the latch 6. At its other end, the plunger 9 carries an enlarged head 12 adapted to bear against the end surface of the head 4 of the screw 3. On the plunger 9, adjacent to the head 12, there is a rectangular shoulder 14 received against rotation in a recess 15 formed in the end of the head 4 of the screw 3.

When the nut 2 is in locked position, the screw 3 is threaded into the bolt 1, the head 4 of the screw abutting against the nut 2, the latch 6 being advanced by the action of the spring 11 until the projections 7 of the latch are received in the seats 8 of the nut 2, the shoulder 14 of the plunger 19 being held against rotation in the recess 15 of the head 4 of the screw. Clearly under the conditions above alluded to, the nut 2 cannot be rotated.

In order to adjust the nut 2, the plunger 9 is pulled outwardly by means of the head 12, in order to retract the latch 6 and to disengage the projections 7 from the seats 8 of the nut 2. The plunger 9 then may be rotated through a small arc until the rectangular shoulder 14 is not in alinement with the recess 15, the inner end of the shoulder 14 engaging the outer surface of the head 4 and serving to hold the latch 6 retracted, the spring 11 being put under additional compression. When the parts are arranged as last above alluded to, the screw 3 may be rotated out of the bolt 1, wholly or in part, to permit an adjustment of the nut 2 on the bolt. After the nut 2 has been moved to the desired positions, the parts are restored to the positions shown in Fig. 1.

Having thus described the invention, what is claimed is:—

In a device of the class described, a bolt; a nut threaded in one direction on the bolt and having oppositely disposed seats; a screw threaded in an opposite direction into the end of the bolt and having an enlarged head engaging the nut; a latch bar movable in the head of the screw longitudinally thereof and having transverse terminal projections coöperating with the seats; spring means housed in the head of the screw for advancing the latch to cause the projections to coöperate with the seats; an operating member carrying the spring means and connected to the latch and slidable in the head of the screw, the operating member being accessible from the end of the head of the screw to effect a retraction of the latch, the operating member being rotatable, and comprising a part engaging the head of the screw to hold the operating member and the latch retracted, after the operating member has been retracted and rotated.

In testimony that I claim the foregoing as my own, I have hereto affixed my signature in the presence of two witnesses.

LOUIS MARTAIN SARTAIN.

Witnesses:
    J. L. ROLLINGS,
    MAT SARDES.